United States Patent
Zheng et al.

(10) Patent No.: US 11,741,142 B2
(45) Date of Patent: Aug. 29, 2023

(54) SYSTEMS AND METHODS FOR ABSTRACTIVE DOCUMENT SUMMARIZATION WITH ENTITY COVERAGE CONTROL

(71) Applicant: salesforce.com, inc., San Francisco, CA (US)

(72) Inventors: Haopeng Zheng, San Francisco, CA (US); Semih Yavuz, Redwood City, CA (US); Wojciech Kryscinski, Palo Alto, CA (US); Kazuma Hashimoto, Menlo Park, CA (US); Yingbo Zhou, Palo Alto, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/589,522

(22) Filed: Jan. 31, 2022

(65) Prior Publication Data

US 2023/0054068 A1    Feb. 23, 2023

Related U.S. Application Data

(60) Provisional application No. 63/230,562, filed on Aug. 6, 2021.

(51) Int. Cl.
*G06F 16/34* (2019.01)
*G06F 40/166* (2020.01)
(Continued)

(52) U.S. Cl.
CPC .......... *G06F 16/345* (2019.01); *G06F 40/166* (2020.01); *G06N 20/00* (2019.01); *G06F 40/117* (2020.01); *G06F 40/279* (2020.01)

(58) Field of Classification Search
CPC .... G06F 16/345; G06F 40/166; G06F 40/279; G06N 20/00
See application file for complete search history.

(56) References Cited

U.S. PATENT DOCUMENTS

2021/0124876 A1* 4/2021 Kryscinski ............ G06F 16/345
2022/0237373 A1* 7/2022 Singh Bawa .......... G06F 40/20
(Continued)

OTHER PUBLICATIONS

Feng Nan et al., Entity-level factual consistency of abstractive text summarization. In Proceedings of the 16th Conference of the European Chapter of the Association for Computational Linguistics: Main Volume, pp. 2727-2733, Online. Association for Computational Linguistics. (2021).
(Continued)

*Primary Examiner* — Asher D Kells
(74) *Attorney, Agent, or Firm* — Haynes and Boone, LLP

(57) ABSTRACT

Embodiments described herein provide document summarization systems and methods that utilize fine-tuning of pre-trained abstractive summarization models to produce summaries that more faithfully track the content of the documents. Such abstractive summarization models may be pre-trained using a corpus consisting of pairs of articles and associated summaries. For each article-summary pair, a pseudo label or control code is generated and represents a faithfulness of the summary with respect to the article. The pre-trained model is then fine-tuned based on the article-summary pairs and the corresponding control codes. The resulting fine-tuned models then provide improved faithfulness in document summarization tasks.

20 Claims, 6 Drawing Sheets

(51) Int. Cl.
*G06N 20/00* (2019.01)
*G06F 40/117* (2020.01)
*G06F 40/279* (2020.01)

(56) References Cited

U.S. PATENT DOCUMENTS

2023/0020886 A1* 1/2023 Mahapatra ............... G06N 3/04
2023/0054068 A1* 2/2023 Zheng ................... G06F 16/345

OTHER PUBLICATIONS

Alexander Fabbri et al., Improving zero and few-shot abstractive summarization with intermediate fine-tuning and data augmentation. In Proceedings of the 2021 Conference of the North American Chapter of the Association for Computational Linguistics: Human Language Technologies, pp. 704-717, Online. Association for Computational Linguistics. (2021).

\* cited by examiner (a)

(b)

SYSTEMS AND METHODS FOR ABSTRACTIVE DOCUMENT SUMMARIZATION WITH ENTITY COVERAGE CONTROL

CROSS-REFERENCE

The present application claims priority to U.S. Provisional Patent Application No. 63/230,562, entitled "SYSTEMS AND METHODS FOR IMPROVED FAITHFULNESS IN DOCUMENT SUMMARIZATION," filed on Aug. 6, 2021, which is herein incorporated by reference in its entirety for all purposes.

TECHNICAL FIELD

The present disclosure relates generally to machine learning (ML) systems, and more specifically to intermediate pre-training for document summarization tasks.

BACKGROUND

Document summarization is a machine learning (ML) task that aims to generate a compact summary that preserves the most salient content of a document. Previous document summarization techniques have struggled to produce faithful summaries that only contain contents that can be derived from the document rather than hallucinated or fabricated information. Therefore, there is a need for pre-training techniques that improve faithfulness in document summarization.

Figure 1:
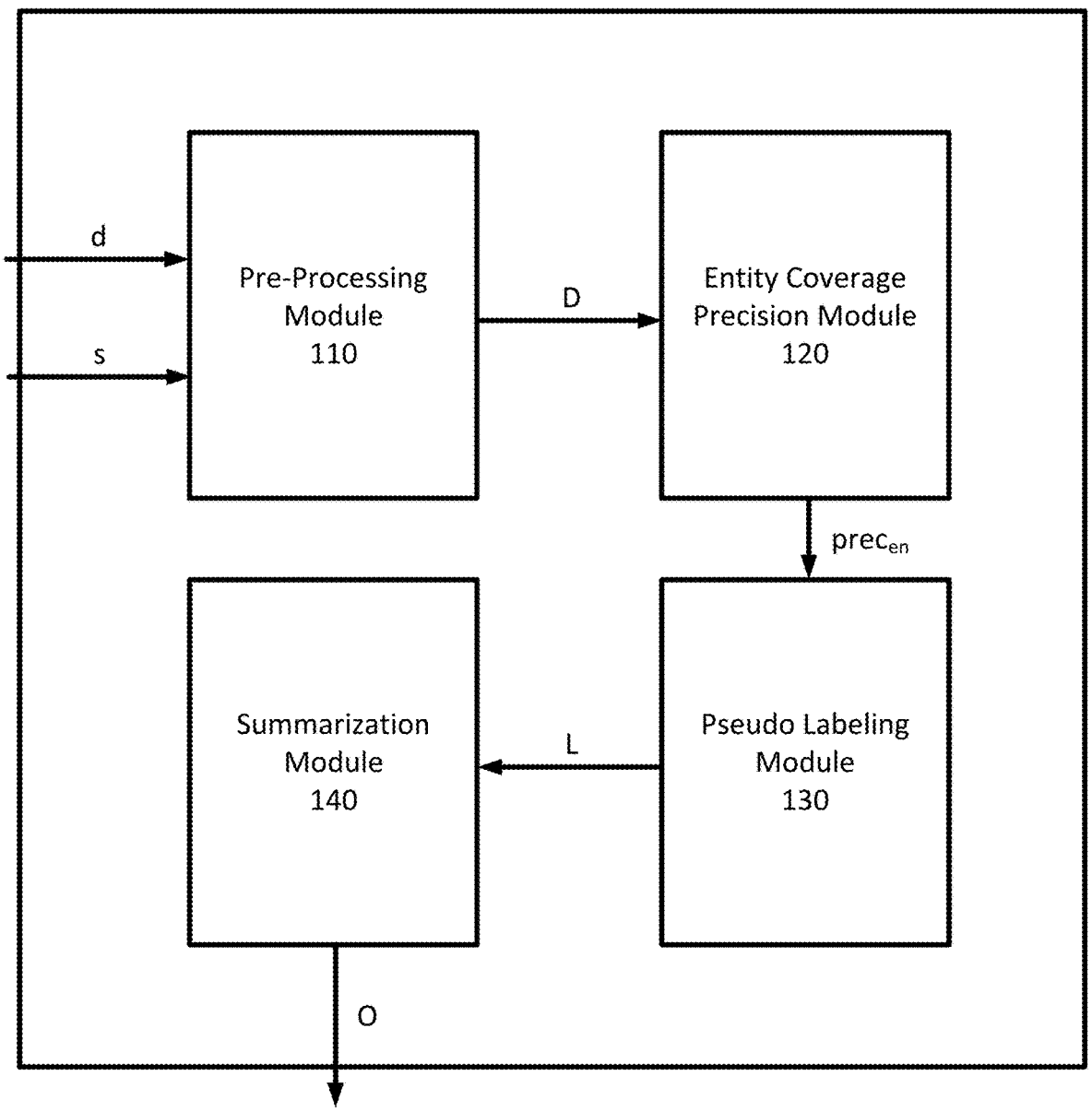
FIG. 1 is a simplified structural diagram of a system for abstractive summarization of a document, according to some embodiments described herein.

In the figures, elements having the same designations have the same or similar functions.

DETAILED DESCRIPTION

As used herein, the term "or" shall convey both disjunctive and conjunctive meanings. For example, the phrase "A or B" may be interpreted to include element A alone, element B alone, or and the combination of elements A and B.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Machine learning (ML) methods have been applied to document summarization tasks such as abstractive summarization, which extracts words and/or phrases from the document to formulate a summary of the document. Given a document, such methods aim to infer a brief summary or abstract that captures most of the meaning of the document. However, such methods may be prone to "hallucinating" facts that do not faithfully represent the contents of the document to be summarized. For example, addition of information that is not actually contained within the document itself may be abstracted as part of the abstractive summary. Such additional information may include entities that are not mentioned within the document itself, and thus mis-represents the content of the document.

For example, Table 1 shows an example of an unfaithful summary of a portion of an article that exhibits hallucination. The original Article discusses a teenage science competition streamed on the YouTube website. However, the Summary generated from the Article includes the website Gumtree, which does not appear in the original Article. This is an example of model hallucination, whereby information that is not actually contained within the Article nonetheless appears in the Summary. The systems and methods presented herein may greatly reduce the occurrence of such model hallucination.

TABLE 1

An example of an unfaithful summary of a portion of an article that exhibits hallucination Article: The site - which is owned by Google - is launching a competition for teenagers to create an experiment that could be carried out in space [. . .] When the experiments are eventually run, the results will be streamed live on YouTube [. . .] Alongside Prof. Hawking, the judging panel consists of former Astronauts Leland Melvin [. . .]
Summary: Stephen Hawking has joined the judging panel of a science competition on the internet education site Gumtree.

In view of the need for more accurate document summarization systems, embodiments described herein provide document summarization systems and methods that utilize fine-tuning of pre-trained abstractive summarization models to produce summaries that more faithfully track the content of the documents. Such abstractive summarization models may be pre-trained using a corpus consisting of pairs of articles and associated summaries. For each article-summary pair, a pseudo label or control code is generated and represents a faithfulness of the summary with respect to the article. The pre-trained model is then fine-tuned based on the article-summary pairs and the corresponding control codes.

The resulting fine-tuned models then provide improved faithfulness in document summarization tasks.

Systems for Abstractive Summarization

FIG. 1 is a simplified structural diagram of a system 100 for abstractive summarization of a document, according to some embodiments. As shown in FIG. 1, the system may comprise a pre-processing module 110, an entity coverage precision module 120, a pseudo labeling module 130, and a summarization module 140.

The pre-processing module 110 may be configured to receive a training dataset. The training dataset may comprise a plurality of n articles $d=\{d_1, d_2, \ldots, d_n\}$ and a plurality of n summaries $s=\{s_1, s_2, \ldots, s_n\}$. The plurality of summaries may be written by one or more human summarizers of the plurality of articles, by one or more ML summarization models, or any combination thereof. Each summary of the plurality of summaries may correspond to an article of the plurality of articles. In some cases, a single unique article may appear in the training dataset more than once and may correspond to multiple summaries. For instance, a single unique article may correspond to multiple summaries, each summary written by a different human summarizer or a different ML summarization model. The pre-processing module 110 may be configured to generate a plurality of n article-summary pairs $D=\{(d_1, s_1), (d_2, s_2), \ldots, (d_n, s_n)\}$. The pre-processing module 110 may generate the plurality of article-summary pairs by pairing each article of the plurality of articles with at least one associated summary of the plurality of summaries. The pre-processing module 110 may then pass the plurality of article-summary pairs to the entity coverage precision module 120.

In one embodiment, during the inference phase, a sequence to sequence model generates summary hypothesis $h_i$ for a given document $d_i$ by $p_\theta(h_i|d_i)$. Ideally, the generated summary $h_i$ shall be faithful, which means all the information in $h_i$ should be entailed by the source document $d_i$.

The entity coverage precision module 120 may be configured to compute, for an article-summary pair of the plurality of article-summary pairs, an entity coverage precision metric $prec_{en}$, which track the degree of entity-level hallucination to maintain faithfulness of the generated summary. The entity coverage precision metric may be based on a number of entity mentions in the article and/or the summary. The entities may comprise, for example people, places, or things in the article and/or the summary. As such, the entity mentions may comprise, for example, mentions of people, places, or things in the article and/or the summary. For instance, the entity coverage precision metric may be calculated by identifying the number $\mathcal{N}(s)$ of entities that appear in the summary and the number $\mathcal{N}(s \cap d)$ of entities that appear in both the summary and the article. The entity coverage precision metric may then be calculated as the ratio of $\mathcal{N}(s \cap d)$ and $\mathcal{N}(s)$, such that $prec_{en} = \mathcal{N}(d \cap s)/\mathcal{N}(s)$. The entity coverage precision module 120 may then pass the entity coverage precision metric to the pseudo labeling module 130.

The pseudo labeling module 130 may be configured to determine a pseudo label for an article summary pair of the plurality of article-summary pairs. The pseudo label may indicate a faithfulness level of the summary to the article. The pseudo label may be based on the entity coverage precision metric computed by the entity coverage precision module. For instance, the pseudo label may be based on an entity coverage rate or an entity coverage ratio, which is computed as the number of entities mentioned by both the summary and the article divided by the number of entities mentioned by the summary (such as the ratio $prec_{en} = \mathcal{N}(d \cap s)/\mathcal{N}(s)$ described herein) between the summary and the article. For each article-summary pair, the pseudo label may be generated by a binning procedure. That is, a plurality of entity coverage precision metrics (such as $prec_{en}$ described herein) may be computed for each article-summary pair of the plurality of article-summary pairs. The resulting plurality of entity coverage precision metrics may then be binned, resulting in a plurality of binned pseudo labels. For each article-summary pair, an entity coverage precision metric may be determined and a binned pseudo label of the plurality of binned pseudo labels may be assigned to the article and the summary based on the entity coverage precision metric. For instance, an entity coverage precision metric $prec_{en}(d_i, s_i)$ may be calculated for each article-summary pair in $D=\{(d_1, s_1), (d_2, s_2), \ldots, (d_n, s_n)\}$ to generate a plurality of entity coverage precision metrics $P=\{prec_{en}(d_1, s_1), prec_{en}(d_2, s_2), \ldots, prec_{en}(d_n, s_n)\}$. The set P may then be binned into k discrete bins, each of which represents a range of entity coverage precision metrics. The boundaries of the bins may be established using a variety of techniques. For instance, the boundaries of the bins may be chosen such that each bin covers an equal range of entity coverage precision metrics. As an example, when k=2, the bins may be chosen to coverage the ranges [0, 0.5], (0.5, 1], when k=3, the bins may be chosen to coverage the ranges [0, 0.33], (0.33, 0.66], (0.66, 1], and so forth. Alternatively, the boundaries of the bins may be chosen such that each bin contains roughly the same number of article-summary pairs. Each bin may then be assigned a pseudo label from the set $\mathcal{L} = \{L_1, L_2, \ldots, L_k\}$. Each article-summary pair of the plurality of article-summary pairs may then be assigned a pseudo label from the set $\mathcal{L}$ based on its associated entity coverage precision metric $prec_{en}(d_i, s_i)$. The article may then be prepended with the determined pseudo label.

The summarization module 140 may be configured to receive the article-summary pair and the prepended pseudo label. The summarization module 140 may be configured to use a summarization model to generate an output summary O conditioned on both the article and the prepended pseudo label. The summarization module may be configured to update the summarization model based on a training objective that compares the output summary and the summary from the training sample of the article-summary pair, e.g., a cross-entropy loss between the output summary and the summary from the training pair. The summarization model may comprise an encoder-decoder model. The summarization model may comprise a sequence-to-sequence (seq2seq) model. The summarization model may be based at least in part on a Bidirectional and Auto-Regressive Transformer (BART) abstractive summarization model (disclosed in M. Lewis et al, BART: denoising sequence-to-sequence pre-training for natural language generation, arXiv: 1910.13461 (2019), which is herein incorporated by reference in its entirety for all purposes).

Figure 2:
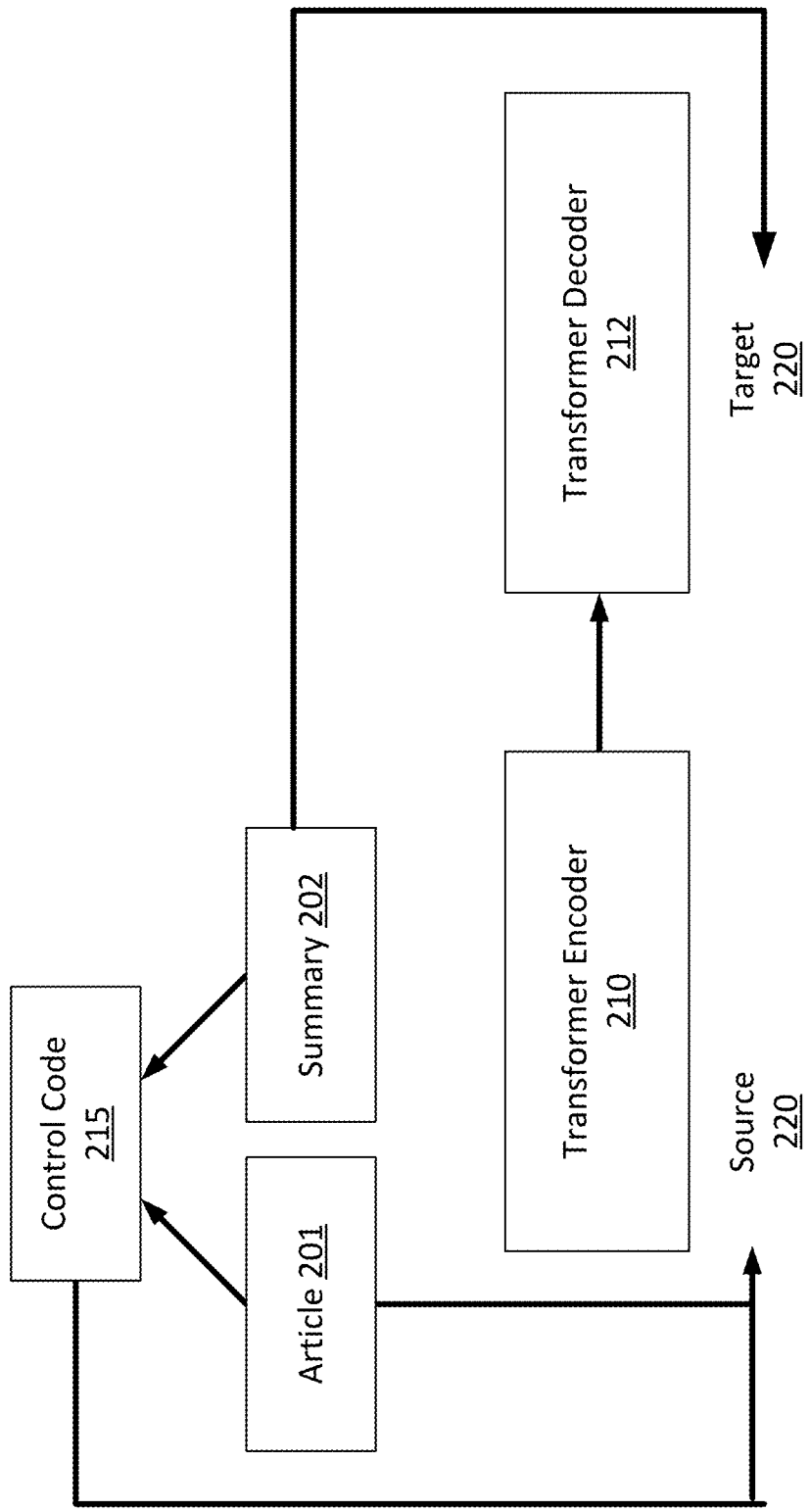
FIG. 2 shows a diagram illustrating aspects of faithfulness (entity coverage) control in an abstractive summarization system, according to one or more embodiments described herein.

FIG. 2 shows a diagram illustrating aspects of faithfulness (entity coverage) control in an abstractive summarization system, according to one or more embodiments described herein. To allow the model to learn different entity-level faithfulness patterns, a faithfulness control code 215 may be adopted. Specifically, a control code Ci is generated for each training document 201 and reference summary 202 pair ($d_i$, $s_i$). The training document 201 is then input to the transformer encoder 210 and transformer decoder 212, which generates an output summary conditioned on both the source document $d_i$ and its control code Ci, which is represented as by $p_\theta(h_i|d_i, C_i)$.

The entity coverage precision $prec_{en}$ is then computed for each document 201 and reference summary 202 in the pair ($d_i$, $s_i$) in the training dataset D. Then, the precision metric is quantized in to k discrete bins, each representing a range of entity faithfulness. These bin boundaries are selected to ensure that each bin contains roughly the same number of training examples to avoid data imbalance. Then each bin is represented by a special token control code $C_i$ and the special tokens $\{C_1, C_2, \ldots, C_k\}$ to the input vocabulary of the summarization model.

During training, the pseudo label (control code) $C_i$ is prepended to the input document 201 as control code. The model of transformer encoder 210 and decoder 212 is now conditioned on both the source document 201 and the control code 215 to learn different faithful level generation patterns from the control codes. During inference, the high faithfulness control code $C_k$ is prepended to all documents in the test set and generate faithful summaries by $p_\theta(h_i|d_i, C_k)$.

As shown in FIG. 2, a training sample of an article 201 and a summary 202 thereof are used to determine the pseudo label (control code) 215. The control code 215 may be generated in any manner described herein with respect to FIG. 1 (for instance, based on a computed entity coverage precision metric described herein with respect to FIG. 1). The control code 215 may be any pseudo label described herein with respect to FIG. 1. The control code 215, the article 201, and the summary 202 may be passed as input to a summarization model, e.g., a transformer encoder 210. The input may be generated by prepending the article with the determined pseudo label, as described herein with respect to FIG. 1. As shown in FIG. 2, the summarization model may be built based on a transformer comprising a transformer encoder 210 and a transformer decoder 212. However, any summarization model described herein with respect to FIG. 1 may take the place of the transformer encoder-transformer decoder pair depicted in FIG. 2. The transformer decoder 210 may then output an output summary. The output summary may be an output summary conditioned on both the article and the prepended pseudo label, as described herein with respect to FIG. 1. The transformer encoder-transformer decoder may then be updated based on a training objective that compares the output summary to the input summary, as described herein with respect to FIG. 1, e.g., the cross-entropy between summary 202 as the target and the output summary from transformer decoder 212.

The training sample of the article 201 and the summary 202 may belong to a training dataset. The training dataset described herein may comprise a plurality of articles and a plurality of summaries that are each associated with a domain-specific database. For instance, the plurality of articles and the plurality of summaries may be obtained from a database such as the Xsum, Pubmed, Samsum, or any other domain-specific database. Such domain-specific databases may utilize article summaries that are written by human experts, such as expert annotators or the authors of the articles themselves.

Figure 3:
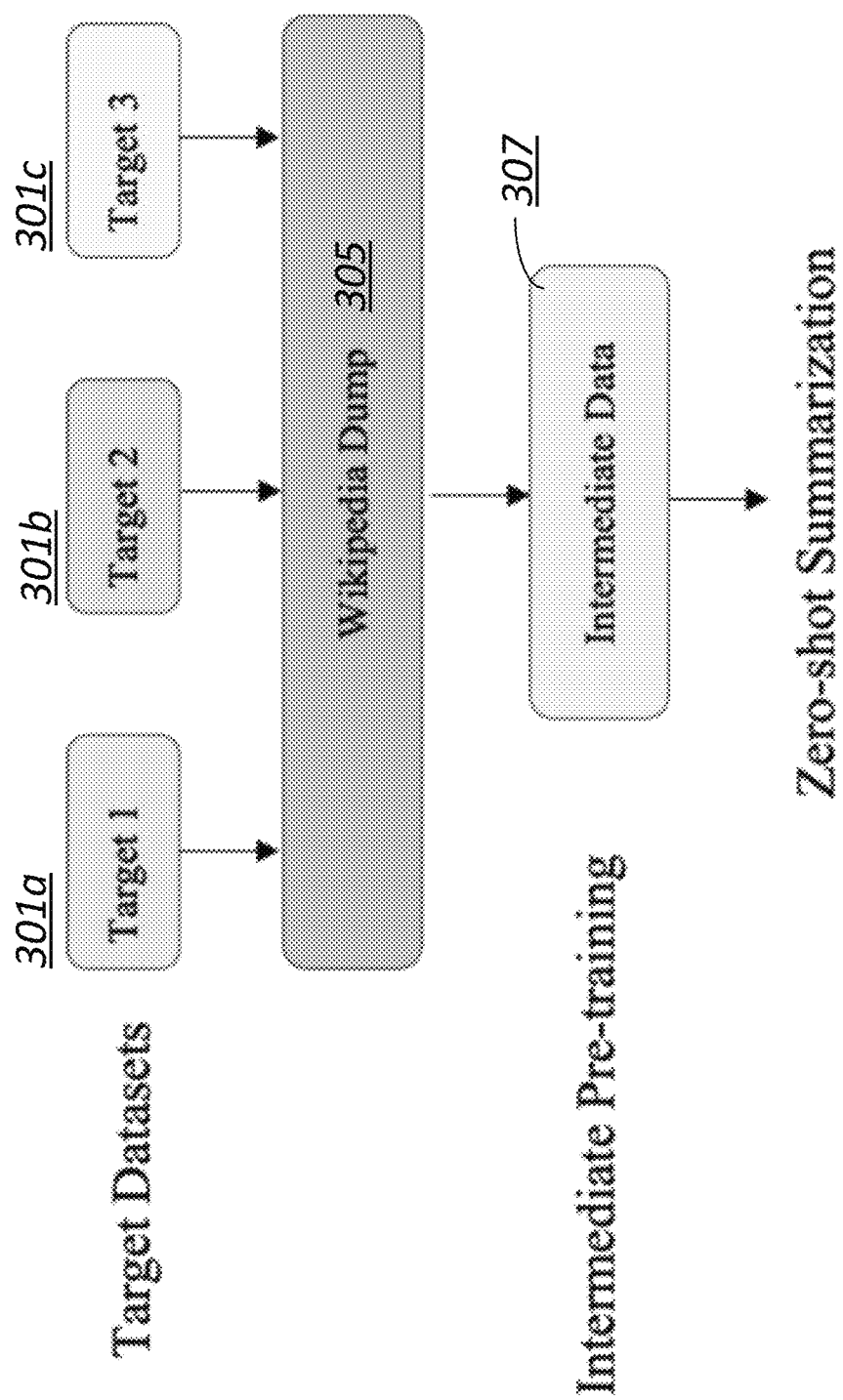
FIG. 3 is an example block diagram illustrating an intermediate pre-training pipeline for zero-shot summarization, according to one or more embodiments described herein.

FIG. 3 is an example block diagram illustrating an intermediate pre-training pipeline for zero-shot summarization, according to one or more embodiments described herein. In FIG. 3, a controllable generalized intermediate pre-training framework for zero-shot summarization is provided. Various target datasets 301a-c from different domains may be incorporated into a Wikipedia corpus 305, which is used to generate pseudo document and summary pairs as intermediate training data. Then a single sequence to sequence model may be trained on the intermediate training data 307, using a similar framework shown in FIGS. 1-2. Zero-shot summarization may then be performed on the target datasets 301a-c.

For example, target-specific intermediate data may be generated from Wikipedia articles. Let T (n, m, a) denote a downstream target dataset of average document length n sentences, average summary length m sentences, and abstractiveness level a. Here abstraciveness level is defined as the upper bound extractive ROUGE1 performance of the target dataset 301a-c. For each available Wikipedia article in a Wikipedia dump 305, the first m sentences of the encyclopedia article may be used to generate a summary. The next n sentences may be used as the corresponding article to the generated summary. Given an abstractiveness level a, a training instance I(n, m, a) may be constructed from the encyclopedia article. This procedure may be repeated for different values of m, n, and a. Thus, a training set using l different values for m, n, and a may allow for the construction of a training set $\mathcal{J} = \{I(n_1, m_1, a_1), I(n_2, m_2, a_2), \ldots, I(n_l, m_l, a_l)\}$. Each member $I(n_i, m_i, a_i)$ of the set $\mathcal{J}$ may be associated with a pseudo label $E_i$ representing the target-specific generation pattern and also add all these special tokens $E = \{E_1, E_2, \ldots, E_l\}$ to the input vocabulary of the model.

In the training phase, each corresponding target pseudo label $E_i$ may be prepended to a corresponding training instance $I(n_i, m_i, a_i)$ to generate the training set. In this way, a summary is generated conditioned on both the source document 201 and the target control code, i.e., the target label Ei. Such training sets may generalize well across different domains of knowledge.

Figure 4:
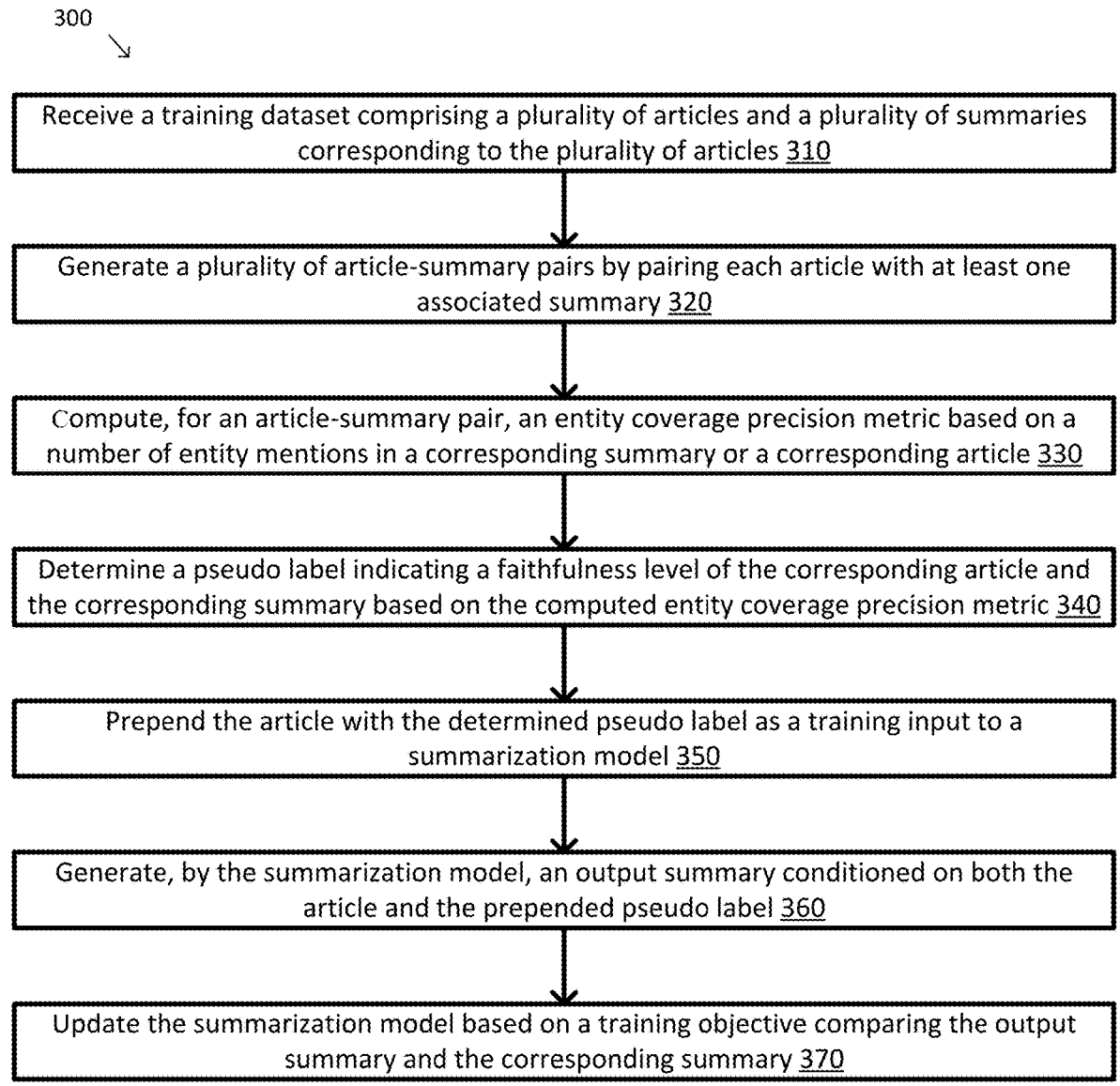
FIG. 4 is a simplified logic flow diagram illustrating a method for abstractive summarization of a document, according to some embodiments described herein.

FIG. 4 is a simplified logic flow diagram illustrating a method 300 for abstractive summarization of a document, according to some embodiments. One or more of the processes of method 300 may be implemented, at least in part, in the form of executable code stored on non-transitory, tangible, machine-readable media that when run by one or more processors may cause the one or more processors to perform one or more of the processes. In some embodiments, method 300 corresponds to the operation of the pre-processing module 110, the entity coverage precision module 120, the pseudo labeling module 130, and/or the summarization module 140 described herein with respect to FIG. 1.

At operation 310, the method 300 may comprise receiving a training dataset comprising a plurality of articles and a plurality of summaries corresponding to the plurality of articles. The training dataset may comprise any training dataset described herein with respect to FIG. 1. The plurality of articles may comprise any plurality of articles described herein with respect to FIG. 1. The plurality of summaries may comprise any plurality of summaries described herein with respect to FIG. 1.

At operation 320, the method 300 may comprise generating a plurality of article-summary pairs by pairing each article with at least one associated summary. The plurality of article-summary pairs may be any plurality of article-summary pairs described herein with respect to FIG. 1. The plurality of article-summary pairs may be generated in any manner described herein with respect to FIG. 1.

At operation 330, the method 300 may comprise computing, for an article-summary pair, an entity coverage precision metric based on a number of entity mentions in a corresponding summary or a corresponding article. The entity coverage precision metric may be any entity coverage precision metric described herein with respect to FIG. 1. The entity coverage precision metric may be computed using any manner described herein with respect to FIG. 1.

At operation 340, the method 300 may comprise determining a pseudo label indicating a faithfulness level of the corresponding article and the corresponding summary based on the computed entity coverage precision metric. The pseudo label may comprise any pseudo label described herein with respect to FIG. 1. The pseudo label may be determined in any manner described herein with respect to FIG. 1.

At operation 350, the method 300 may comprise prepending the article with the determined pseudo label as a training input to a summarization model. The article may be prepended with the pseudo label in any manner described herein with respect to FIG. 1.

At operation 360, the method 300 may comprise generating, by the summarization model, an output summary conditioned on both the article and the prepended pseudo label. The summarization model may comprise any summarization model described herein with respect to FIG. 1. The output summary may be generated in any manner described herein with respect to FIG. 1.

At operation 370, the method may comprise updating the summarization model based on a training objective comparing the output summary and the corresponding summary. The summarization model may be updated in any manner described herein with respect to FIG. 1.

Computer Systems

Figure 5:
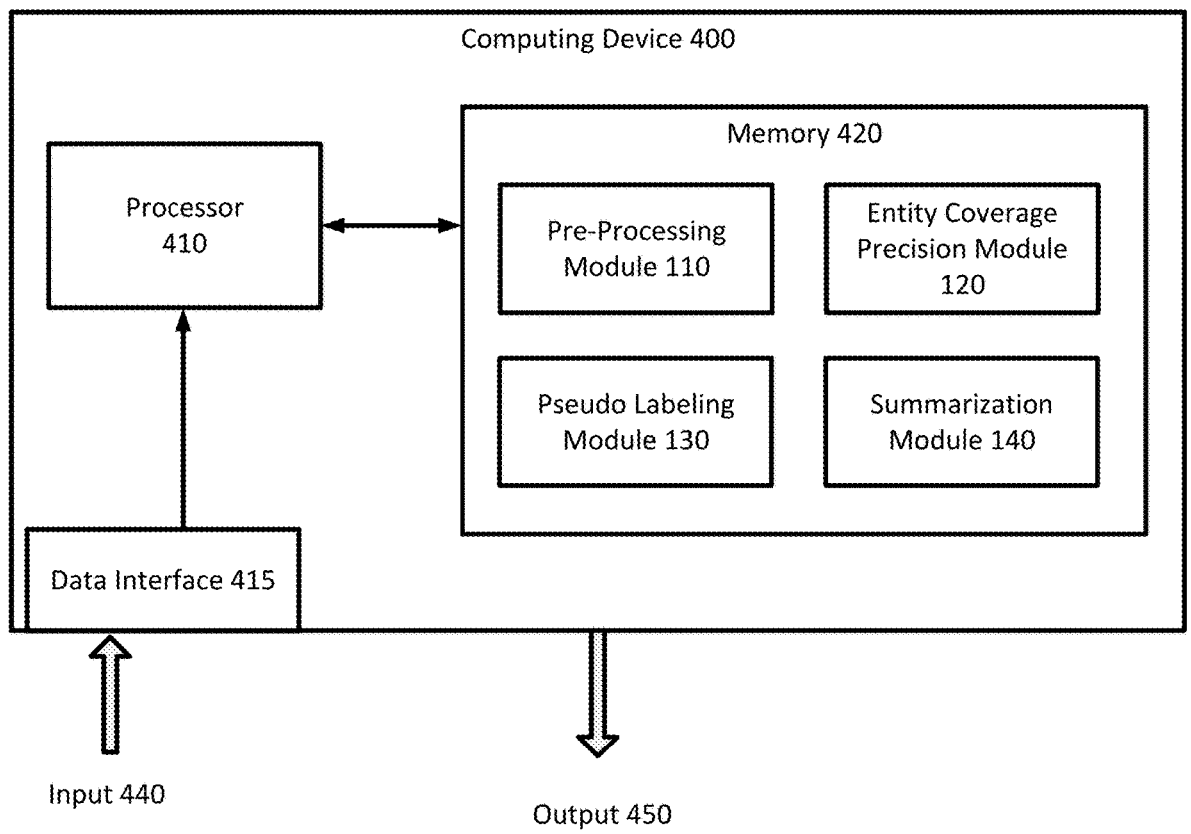
FIG. 5 is a simplified diagram of a computing device for abstractive summarization of a document, according to some embodiments described herein.

FIG. 5 is a simplified diagram of a computing device 400 for abstractive summarization of a document, according to some embodiments. As shown in FIG. 4, computing device 400 includes a processor 410 coupled to memory 420. Operation of computing device 400 is controlled by processor 410. Although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein (such as method 300 described herein with respect to FIG. 3). For example, as shown, memory 420 includes instructions for pre-processing module 110, that may be used to implement and/or emulate the systems and models, and/or to implement any of the methods described further herein. In some examples, the pre-processing module 110, may receive an input 440, e.g., such as a training dataset comprising a plurality of articles and a plurality of summaries corresponding to the plurality of articles, via a data interface 415. The data interface 415 may be any of a user interface that receives a training dataset from a user, or a communication interface that may receive or retrieve a training dataset from a database. The pre-processing module 110 may then generate a plurality of article-summary pairs by pairing each article with at least one associated summary.

The memory 420 may further include instructions for entity coverage precision module 120, that may be used to implement and/or emulate the systems and models, and/or to implement any of the method described herein. In some examples, the entity coverage precision module 120 may compute, for an article-summary pair, an entity coverage precision metric based on a number of entity mentions in a corresponding summary or a corresponding article.

The memory 420 may further include instructions for pseudo labeling module 130, that may be used to implement and/or emulate the systems and models, and/or to implement any of the method described herein. In some examples, the pseudo labeling module 130 may determine a pseudo label indicating a faithfulness level of the corresponding article and the corresponding summary based on the computed entity coverage precision metric. The pseudo labeling module may prepend the article with the determined pseudo label as a training input to a summarization model.

The memory 420 may further include instructions for summarization module 140, that may be used to implement and/or emulate the systems and models, and/or to implement any of the method described herein. In some examples, the summarization module 140 may generate, by the summarization model, an output summary conditioned on both the article and the prepended pseudo label.

The memory may further include instructions to update the summarization model based on a training objective comparing the output summary and the corresponding summary.

Some examples of computing devices, such as computing device 400 may include non-transitory, tangible, machine readable media that include executable code that when run by one or more processors (e.g., processor 410) may cause the one or more processors to perform the processes of method 300. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

EXAMPLES

Example 1: Experimental Methods and Results

Experiments implementing the systems and methods described herein were performed using a variety of domain-specific databases and encyclopedias. For domain-specific experiments, summarization datasets from the news, scientific paper, and dialog domains were utilized. The news dataset comprised the Xsum dataset, which contained 226,711 British Broadcasting Corporation (BBC) articles paired with their one-sentence summaries. All summaries were written by the author journalists writing the articles. The scientific paper dataset comprised the Pubmed dataset, which contained 93,204 medical scientific papers from PubMed OpenAccess repositories. The introduction section of each paper was used as source article and the abstract section as the corresponding summary. The dialog dataset comprised the Samsum dataset, which contained 16,369 messenger-like conversations between two or more interlocutors pairs with summaries written by language experts.

Results from the systems and methods described herein were compared with the following methods: original BART-large (described in M. Lewis et al, BART: denoising sequence-to-sequence pre-training for natural language generation, translation, and comprehension, in *Proc. 58th Ann. Meeting of the Ass'n for Comput'l Linguistics,* 7871-7880 (2020), which is herein incorporated by reference in its entirety for all purposes), BART outputs with post-processing correction (as disclosed in S. Chen et al, Improving faithfulness in abstractive summarization with contrast candidate generation and selection, arXiv: 2104.09061 (2021), which is herein incorporated by reference in its entirety for all purposes), BART with entity-based data filtering (disclosed in F. Nan et al, Entity-level factual consistency of abstractive text summarization, in *Proc. 16th Conf. of the Euro. Chapter of the Ass'n for Comput'l Linguistics,* 2727-2733 (2021), which is herein incorporated by reference in its entirety for all purposes), and zero-shot Wikipedia intermediate fine-tuning WikiTransfer (disclosed in A. Fabbri et al, Improving zero and few-shot abstractive summarization with intermediate fine-tuning and data augmentation, in *Proc.* 2021 *Conf. of the N. Amer. Chapter of the Ass'n for Comput'l Linguistics,* 704-717 (2021), which is herein incorporated by reference in its entirety for all purposes.

The generated summaries were compared based on quality and faithfulness. For summary quality, the Rouge (disclosed in C. Y. Lin, Rouge: a package for automatic evaluation of summaries, in *Text summarization branches out,* 74-81 (2004), which is herein incorporated by reference in its entirety for all purposes) and BERTSCORE (disclosed in T. Zhang et al, Bertscore: evaluating text generation with bert, arXiv: 1904.09675 (2019), which is herein incorporated by reference in its entirety for all purposes) metrics were used to measure the fluency and salience of output summary. For summary faithfulness, the Entity Coverage Precision (disclosed in F. Nan et al, Entity-level factual consistency of abstractive text summarization, in *Proc. 16th Conf. of the Euro. Chapter of the Ass'n for Comput'l Linguistics,* 2727-2733 (2021), which is herein incorporated by reference in its entirety for all purposes) and FEQA (disclosed in E. Durmus et al, FEQA: a question answering evaluation framework for faithfulness assessment in abstractive summarization, in *Proc. 58th Ann. Meeting of the Ass'n for Comput'l Linguistics,* 5055-5070 (2020), which is herein incorporated by reference in its entirety for all purposes) metrics were used. FEQA is an automatic question answering (QA) based metric for faithfulness by generating questions from summary and extract answers from the corresponding document by QA models. Expert annotators were also asked to perform human evaluation in both summary faithfulness and quality.

Huggingface libraries (disclosed in T. Wolf et al, Transformers: state-of-the-art natural language processing, in *Proc.* 2020 *Conf. on Empirical Methods in Natural Language Processing,* 38-45 (2020), which is herein incorporated by reference in its entirety for all purposes) were used for all experiment implementations. The backbone abstractive summarization model was BART-large, a pre-trained denoising autoencoder language model with 336 million parameters based on the sequence-to-sequence transformer (disclosed in A. Vaswani et al, Attention is all you need, in *Advances in neural info processing systems,* 5998-6008 (2017), which is herein incorporated by reference in its entirety for all purposes). For fair comparison, BART-large was fine-tuned on each dataset on 8 Tesla A100 GPU pods with same learning rate 5e-5 with weight decay using the Adam optimizer (disclosed in D. P. Kingma and J. Ba, Adam: a method for stochastic optimization, arXiv: 1412.6980 (2014), which is herein incorporated by reference in its entirety for all purposes). For entity recognition, a neural Named Entity Recognition (NER) system from the Stanza NLP toolkit (disclosed in P. Qi et al, Stanza: a python natural language processing toolkit for many human languages, in *Proc. 58th Ann. Meeting of the Ass'n for Comput'l Linguistics,* 101-180 (2020), which is herein incorporated by reference in its entirety for all purposes) was used and trained on the OntoNotes corpus (disclosed in P. Weischedel et al, OntoNotes release 4.0, *LDC2011T03* (2011), which is herein incorporated by reference in its entirety for all purposes) except for the Pubmed dataset. Since Pubmed is a medical scientific article collection, biomedical, scientific and clinical text Named Entity Recognition toolkit scispaCy (disclosed in M. Neumann et al, SciscpaCy: fast and robust models for biomedical natural language processing, in *Proc. 18th BioNLP Workshop and Shared Task,* 319-327 (2019), which is herein incorporated by reference in its entirety for all purposes) was used instead.

Table 2 shows an example of an article and a summary generated using the systems and methods disclosed herein.

TABLE 2

Exemplary article and summary generated using the systems and methods disclosed herein Article: After the pre-season transfer window from 1 January to 18 March and the first half of the league campaign, Manchester City Women lead the WSL 1 table ahead of defending champions Chelsea Ladies and third-placed Birmingham City. Keep up to date with all of the key confirmed signings before the season resumes on 26 June.
Summary: The Women's Super League One season will begin on 26 June, with Manchester City Women hosting Birmingham City in the opening game of the campaign.

Table 3 shows the performance of the systems and methods described herein on three downstream datasets in different domains. Compared to the output summaries of BART without entity control, the systems and methods described herein increased the entity coverage precision (second column) of generated summaries with roughly the same summary quality (Rouge score and BertScore). The Rouge scores and BertScore dropped a little bit compared to BART on Xsum dataset, but increased on Pubmed and Samsum. This may be due to the low faithfulness level of the reference summaries in the Xsum dataset.

TABLE 3

Comparison of performance on three downstream datasets in different domains

| Model | Entity Coverage | R-1 | R-2 | R-L | BertScore |
|---|---|---|---|---|---|
| Xsum Dataset | | | | | |
| Reference | 50.02 | 100 | 100 | 100 | 100 |
| BART-large | 54.11 | 44.78 | 21.60 | 36.64 | 91.5 |
| Methods herein + Wikipedia | 59.38 | 43.82 | 21.15 | 35.97 | 91.4 |
| | 60.10 | 44.21 | 21.26 | 36.36 | 91.5 |
| Pubmed Dataset | | | | | |
| Reference | 42.85 | 100 | 100 | 100 | 100 |
| BART-large | 74.31 | 43.35 | 16.20 | 39.50 | 85.5 |
| Methods herein + Wikipedia | 76.38 | 43.46 | 16.24 | 39.68 | 85.5 |
| | 76.54 | 43.68 | 16.28 | 39.46 | 85.6 |
| SamSum Dataset | | | | | |
| Reference | 71.20 | 100 | 100 | 100 | 100 |
| BART-large | 78.50 | 52.39 | 27.89 | 43.58 | 92 |
| Methods herein + Wikipedia | 80.23 | 52.42 | 27.69 | 43.34 | 91.5 |
| | 80.36 | 52.24 | 27.58 | 43.25 | 91.7 |

The systems and methods described herein were also compared to state-of-the-art baseline methods in increasing entity level faithfulness on the Xsum dataset, as shown in Table 4. There was a trade-off between entity coverage precision and the quality of the generated summary. When the model learned to copy more from the original document, the entity coverage precision tended to increase, but the quality of the output summary dropped at the same time. Compared to F. Nan et al, 2021, where only faithful training examples are kept, the systems and methods described herein didn't need to sacrifice any training data and could maintain the original distribution of the training set. The Question Answering (QA) based metric had a similar trend to the entity level faithfulness metric entity coverage precision, which verifies the effectiveness of increasing entity faithfulness in summary generation.

TABLE 4

Comparison of baseline model performance on the Xsum dataset

| Model | Entity Coverage | FEQA | R-1 | R-L |
|---|---|---|---|---|
| BART | 54.11 | 22.50 | 44.78 | 36.64 |
| S. Chen et al, 2021 | 55.57 | 25.62 | 43.48 | 35.32 |
| F. Na et al, 2021 | 70.49 | 26.73 | 42.19 | 33.97 |
| Methods herein | 59.38 | 26.51 | 43.82 | 35.97 |

The mechanism by which the controllable Wikipedia intermediate pre-training systems and methods described herein help zero-shot summarization was also studied. Table 5 shows the zero-shot performance results of the systems and methods presented herein model on the Xsum and Pubmed datasets. Without any fine-tuning, BART tended to directly copy from the original source document so it achieved a very high entity coverage precision (92:61), but a rather low summary quality since the model was not trained on the dataset. In contrast, with the intermediate pre-training described herein, BART learned the characteristic of the downstream dataset and achieved a large improvement in Rouge score. Compared to the baseline model Wikitransfer, the systems and methods presented herein achieved improvements in both the entity coverage precision and summary quality. The systems and method described herein were also generalized across datasets, allowing for a single model for different downstream tasks instead of training separate models like in Wikitransfer.

TABLE 5

Comparison of zero-shot setting performance on two downstream datasets in different domains

| Model | Entity Coverage | R-1 | R-2 | R-L |
|---|---|---|---|---|
| Xsum Dataset | | | | |
| BART | 92.61 | 19.45 | 3.01 | 13.29 |
| Wikitransfer | 50.50 | 29.39 | 8.90 | 21.98 |
| Methods herein | 55.48 | 30.05 | 9.72 | 22.99 |
| Pubmed Dataset | | | | |
| BART | 42.85 | 31.65 | 10.17 | 16.60 |
| Wikitransfer | 62.72 | 38.64 | 13.28 | 19.37 |
| Methods herein | 68.13 | 38.42 | 13.34 | 19.32 |

Table 6 shows the human evaluation results on 50 randomly sampled subset of articles from the Xsum dataset following the setting of prior works (S. Chen et al, 2021). Four expert annotators assigned each summary output into three faithfulness categories (faithful summary (FF), intrinsic hallucination (IN), extrinsic hallucination (EX)), and three summary quality categories (low, medium, and high). Following the approach Chen et al., 2021, additional annotations from two other experts were used to calculate the inter-annotator agreement.

TABLE 5

Human Evaluation results of 50 test examples on Xsum Dataset

| Model | Faith. % | Ex. % | In. % | Quality |
|---|---|---|---|---|
| BART | 15.0 | 54.0 | 39.0 | 2.31 |
| +CORRECT (Chen et al., 2021) | 27.0 | 48.0 | 47.0 | 2.42 |
| +CONTROL | 28.0 | 41.0 | 37.0 | 2.41 |
| ZERO-SHOT | 31.0 | 48.0 | 38.0 | 1.73 |

Figure 6:
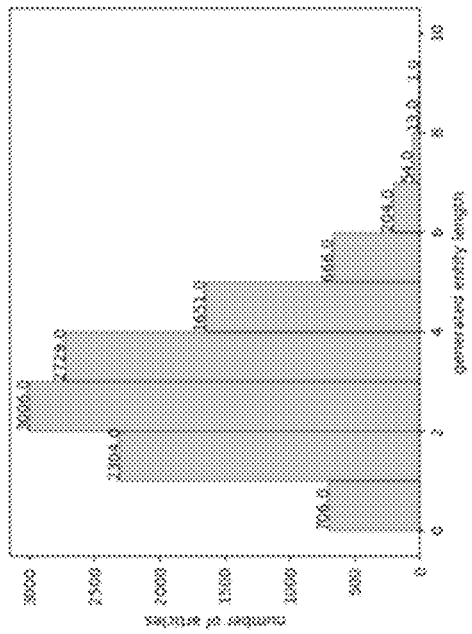
FIG. 6 shows the distribution of number of entities in the generated summaries by the systems and method described herein and by the BART-large method, according to some embodiments described herein.
Figure 6:
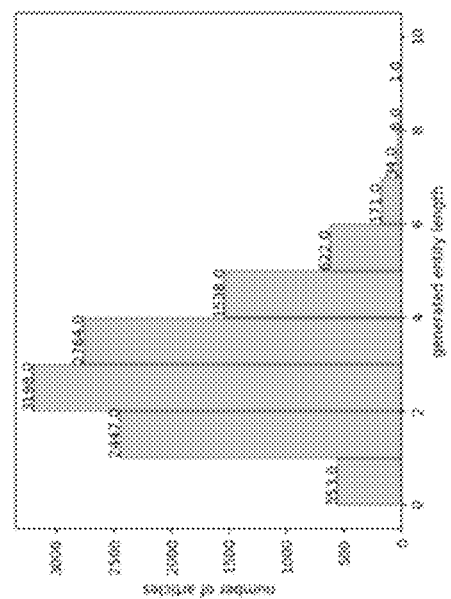

To verify if there was a need to control the number of entities during summary generation, the distribution of number of entities in the generated summaries by the systems and method described herein and by BART-large are shown in FIG. 6. Panel (a) shows the distribution for the systems and methods described herein, while panel (b) shows the distribution for BART-large. The two distributions were very similar and had almost the same mean number of entities. As a result, the systems and methods described herein likely didn't under-generate nor over-generate entities from the source document. Thus, there is likely no need to separately control the entity compression rate.

The method by which the control codes helped to improve the model performance was investigated. Pseudo faithfulness labels (low, medium, high) were generated and prepended for each training examples during training phase and generate with high control code during inference. In this way, the model was implicitly taught to learn the generation style from faithful examples. As shown in Table 7, the systems and methods described herein still generated reasonable summaries even inferred with low and medium control codes. There was also a trade-off between entity coverage precision and the quality of the generated summary during inference, such that summaries inferred with low control codes had even higher ROUGE scores. This may be due to the unfaithful reference summaries of the XSUM dataset.

TABLE 7

Results for summaries inferred with different control codes on the Xsum dataset

| Model | Entity Coverage | R-1 | R-2 | R-L |
|---|---|---|---|---|
| BART-large | 54.11 | 44.78 | 21.60 | 36.64 |
| Low | 51.32 | 44.03 | 21.23 | 36.12 |
| Medium | 53.50 | 43.94 | 21.21 | 35.94 |
| High | 59.38 | 43.82 | 21.15 | 35.97 |

Table 7 shows qualitative examples where the systems and methods described herein were trained on the Xsum dataset. Example 1 shows how entity control methods get rid of hallucination terms from BART output. Example 2 shows the outputs of the systems and methods described herein with different control codes during inference. Example 3 shows the zero-shot setting of BART and intermediate pre-training models described herein. While BART simply copied some random sentences in the zero shot setting, the systems and methods described herein model generated high quality summarizes instead.

TABLE 8

Generated and ground truth summary examples from the Xsum dataset

Example 1:

BART: A video game based on one of the world's most popular wrestling traditions has been launched at the E3 gaming show in Los Angeles.'
Correction: A video game based on one of the world's most popular wrestling traditions has been launched at the E3 gaming show in Mexico.
Methods herein: A video game dedicated to Mexican wrestling has been released at E3.
Reference: One of the more unusual titles at E3, the worlds largest video games exhibition held each year in Los Angeles, is Konami's Lucha Libre AAA: Heroes del Ring.

Example 2:

BART: Tourists in Spain have been accused of harassing a dolphin after it became stranded on a beach.
Low Code: A dolphin that became stranded in the sea off the coast of Spain has been harassed by a group of tourists.
High Code: A dolphin that became stranded in the sea off the coast of Andalucia has been harassed by tourists.
Reference: A baby dolphin has died after it was surrounded by tourists looking to take photographs on a beach in southern Spain.

Example 3:

Document: The warning begins at 22:00 GMT on Saturday and ends at 10:00 on Sunday. The ice could lead to difficult driving conditions on untreated roads and slippery conditions on pavements, the weather service warned. Only the southernmost counties and parts of the most westerly counties are expected to escape. Counties expected to be affected are Carmarthenshire, Powys, Ceredigion, Pembrokeshire, Denbighshire, Gwynedd, Wrexham, Conwy, Flintshire, Anglesey, . . . , Rhondda Cynon Taff and Torfaen.
Reference: The Met Office has issued a yellow weather warning for ice across most of Wales.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for abstractive summarization of a document, the method comprising:
   receiving, via a data interface, a training dataset comprising a plurality of articles and a plurality of summaries corresponding to the plurality of articles;
   generating a plurality of article-summary pairs by pairing each article with at least one associated summary;
   computing, for an article-summary pair, an entity coverage precision metric based on a number of entity mentions in a corresponding summary or a corresponding article;
   determining a pseudo label indicating a faithfulness level of the corresponding article and the corresponding summary based on the computed entity coverage precision metric;
   prepending the article with the determined pseudo label as a training input to a summarization model;
   generating, by the summarization model, an output summary conditioned on both the article and the prepended pseudo label; and updating the summarization model based on a training objective comparing the output summary and the corresponding summary.

2. The method of claim 1, wherein the summarization model is based at least in part on a Bidirectional and Auto-Regressive Transformer (BART) summarization model.

3. The method of claim 1, wherein the plurality of articles comprise a first article and a second article, each associated with a domain-specific database.

4. The method of claim 1, wherein the plurality of articles comprises an encyclopedia article.

5. The method of claim 4, further comprising:
generating the output summary conditioned on the encyclopedia article and the prepended pseudo label.

6. The method of claim 1, wherein the entity coverage precision metric between the summary and the article is computed as a first number of entities mentioned by both the summary and the article divided by a second number of entities mentioned by the summary.

7. The method of claim 1, wherein the determining the pseudo label indicating the faithfulness level of the corresponding article and the corresponding summary based on the at least one computed entity coverage precision metric for the training dataset comprises:
computing a plurality of entity coverage precision metrics corresponding to the plurality of article-summary pairs;
binning the plurality of entity coverage precision metrics to determine a plurality of binned pseudo labels;
computing an entity coverage precision metric for the corresponding article and the corresponding summary; and
assigning a binned pseudo label of the plurality of binned pseudo labels to the corresponding article and the corresponding summary based on the entity coverage precision metric for the corresponding article and the corresponding summary.

8. A system for abstractive summarization of a document, the system comprising:
a non-transitory memory; and
one or more processor coupled to the non-transitory memory and configured to read instructions from the non-transitory memory to cause the system to perform operations comprising:
receiving, via a data interface, a training dataset comprising a plurality of articles and a plurality of summaries corresponding to the plurality of articles;
generating a plurality of article-summary pairs by pairing each article with at least one associated summary;
computing, for an article-summary pair, an entity coverage precision metric based on a number of entity mentions in a corresponding summary or a corresponding article;
determining a pseudo label indicating a faithfulness level of the corresponding article and the corresponding summary based on the computed entity coverage precision metric;
prepending the article with the determined pseudo label as a training input to a summarization model;
generating, by the summarization model, an output summary conditioned on both the article and the prepended pseudo label; and
updating the summarization model based on a training objective comparing the output summary and the corresponding summary.

9. The system of claim 8, the plurality of articles comprise a first article and a second article, each associated with a domain-specific database.

10. The system of claim 8, wherein the training dataset comprises a plurality of articles and a plurality of summaries each associated with a domain-specific database.

11. The system of claim 8, wherein the training dataset comprises a plurality of articles and a plurality of summaries each associated with an encyclopedia article.

12. The system of claim 11, wherein the operations further comprise generating the output summary conditioned on the encyclopedia article and the prepended pseudo label.

13. The system of claim 8, wherein the entity coverage precision metric between the summary and the article is computed as a first number of entities mentioned by both the summary and the article divided by a second number of entities mentioned by the summary.

14. The system of claim 8, wherein the determining the pseudo label indicating the faithfulness level of the corresponding article and the corresponding summary based on the at least one computed entity coverage precision metric for the training dataset comprises:
computing a plurality of entity coverage precision metrics corresponding to the plurality of article-summary pairs;
binning the plurality of entity coverage precision metrics to determine a plurality of binned pseudo labels;
computing an entity coverage precision metric for the corresponding article and the corresponding summary; and
assigning a binned pseudo label of the plurality of binned pseudo labels to the corresponding article and the corresponding summary based on the entity coverage precision metric for the corresponding article and the corresponding summary.

15. A non-transitory, machine-readable medium having stored thereon machine-readable instructions executable to cause a system to perform operations comprising:
receiving, via a data interface, a training dataset comprising a plurality of articles and a plurality of summaries associated with the plurality of articles;
generating a plurality of article-summary pairs by pairing each article with at least one associated summary;
computing, for an article-summary pair, an entity coverage precision metric based on a number of entity mentions in a corresponding summary or a corresponding article;
determining a pseudo label indicating a faithfulness level of the corresponding article and the corresponding summary based on the computed entity coverage precision metric;
prepending the article with the determined pseudo label as a training input to a summarization model;
generating, by the summarization model, an output summary conditioned on both the article and the prepended pseudo label; and
updating the summarization model based on a training objective comparing the output summary and the corresponding summary.

16. The non-transitory, machine-readable medium of claim 15, wherein the training dataset comprises a plurality of articles and a plurality of summaries each associated with a domain-specific database.

17. The non-transitory, machine-readable medium of claim 15, wherein the training dataset comprises a plurality of articles and a plurality of summaries each associated with an encyclopedia article.

18. The non-transitory, machine-readable medium of claim 17, wherein the operations further comprise generating the plurality of summaries associated with the encyclopedia article.

19. The non-transitory, machine-readable medium of claim 15, wherein the entity coverage precision metric between the summary and the article is computed as a first number of entities mentioned by both the summary and the article divided by a second number of entities mentioned by the summary.

20. The non-transitory, machine-readable medium of claim 15, wherein the determining the pseudo label indicating the faithfulness level of the corresponding article and the corresponding summary based on the at least one computed entity coverage precision metric for the training dataset comprises:
   computing a plurality of entity coverage precision metrics corresponding to the plurality of article-summary pairs;
   binning the plurality of entity coverage precision metrics to determine a plurality of binned pseudo labels;
   computing an entity coverage precision metric for the corresponding article and the corresponding summary; and
   assigning a binned pseudo label of the plurality of binned pseudo labels to the corresponding article and the corresponding summary based on the entity coverage precision metric for the corresponding article and the corresponding summary.

* * * * *